(12) United States Patent
Mattathil

(10) Patent No.: US 7,290,035 B2
(45) Date of Patent: Oct. 30, 2007

(54) EMAIL SENDER VERIFICATION SYSTEM

(75) Inventor: George P. Mattathil, P.O. Box 249, San Bruno, CA (US) 94066

(73) Assignee: George P. Mattathil, San Jose, CA (US)

(*) Notice: Subject to any disclaimer, the term of this patent is extended or adjusted under 35 U.S.C. 154(b) by 372 days.

(21) Appl. No.: 10/905,346

(22) Filed: Dec. 29, 2004

(65) Prior Publication Data

US 2005/0144239 A1 Jun. 30, 2005

Related U.S. Application Data

(60) Provisional application No. 60/532,975, filed on Dec. 29, 2003.

(51) Int. Cl.
*G06F 15/16* (2006.01)
(52) U.S. Cl. .................................................... 709/206
(58) Field of Classification Search ................ 709/206
See application file for complete search history.

(56) References Cited

U.S. PATENT DOCUMENTS

| | | | | |
|---|---|---|---|---|
| 6,327,656 | B2* | 12/2001 | Zabetian ..................... | 713/176 |
| 6,625,642 | B1* | 9/2003 | Naylor et al. ............... | 709/206 |
| 6,650,890 | B1 | 11/2003 | Irlam et al. | |
| 7,149,801 | B2* | 12/2006 | Burrows et al. ............ | 709/225 |
| 2002/0007453 | A1* | 1/2002 | Nemovicher ................ | 713/155 |
| 2002/0107918 | A1* | 8/2002 | Shaffer et al. .............. | 709/203 |
| 2004/0019643 | A1* | 1/2004 | Zirnstein, Jr. .............. | 709/206 |
| 2004/0054887 | A1* | 3/2004 | Paulsen et al. ............. | 713/154 |
| 2004/0181571 | A1 | 9/2004 | Atkinson et al. | |
| 2004/0181585 | A1 | 9/2004 | Atkinson et al. | |
| 2004/0260778 | A1* | 12/2004 | Banister et al. ............ | 709/206 |
| 2005/0091367 | A1* | 4/2005 | Pyhalammi et al. ........ | 709/224 |

OTHER PUBLICATIONS

Free, Multipurpose Internet Mail Extensions, Nov. 1996, Network Working Group Request for Comments: 2045, http://www.ietf.org/rfc/rfc2045.txt.*
Yahoo! Anti-Span Resource Center; Home FAQs Tools Tips Fun Facts Spam and the Law DomainKeys; 2004.
Network Working Group; Internet-Draft; Draft-fenton-identified-mail-01 by J. Fenton and M. Thomas; Oct. 14, 2004.
MARID Working Group; Internet-Draft; Sender ID: Authenticating E-Mail; by J. Lyon and M. Wong; Aug. 2004.
MARID; Internet-Draft; Client SMTP Validation (CSV); by D. Crocker, J. Leslie, D. Otis; Jul. 14, 2004.
MARID Working Group; Internet Draft; Purported Responsible Address in E-Mail Messages; by J. Lyon; Aug. 2004.
MASS; Internet-Draft; Bounce Address Tag Validation (BATV); by J. Levine, D. Crocker; S. Silberman and T. Finch; Sep. 7, 2004.

* cited by examiner

*Primary Examiner*—Phuoc H Nguyen
(74) *Attorney, Agent, or Firm*—Raymond E. Roberts; Intellectual Property Law Offices

(57) ABSTRACT

A method and system for email sender verification. A tag is included in an email that contains an identity datum for the sender that is associated with their email address in a server. The email is sent via a network, thus associating a sender address with the email. At least the identity datum, taken from the tag, is then provided to the server, to retrieve the email address. The email address and the sender address are then compared, verifying that the email came from the sender if these match.

20 Claims, 13 Drawing Sheets

(Multidimensional,
2 shown)

EMAIL SENDER VERIFICATION SYSTEM

CROSS-REFERENCE TO RELATED APPLICATIONS

This application claims the benefit of U.S. Provisional Application No. 60/532,975, filed Dec. 29, 2003.

TECHNICAL FIELD

The present invention relates generally to electronic mail (email), and more particularly to reducing unwanted email. Some anticipated initial applications of the present invention include effective management of non-spam email, support for the cataloging of web sites and pages, and interlinking systems based on an email header syntax.

BACKGROUND ART

There is a growing need for improving the management and administration of network services that use the Internet, especially email. One example of the current lack of adequate management and administration is the uncontrolled growth of spam (unsolicited) email, which is a nuisance for spam email recipients.

The strategies currently used to manage spam are filtering, public-key certificate based authentication, and challenge-response. Filtering strategies are not viable because it is impossible to generalize appropriate filters, and this leads to an increased risk of false-positives as higher levels of filtering are applied. Certificate based authentication strategies are presently premature due to the lack of a widely deployed infrastructure for the distribution and management of certificates. Challenge-response strategies are also limited because, instead of actually solving the problem, they merely transfer burdens to the senders of useful emails.

The reason for the explosion of spam emails is the ease with which senders can remain anonymous, without a correspondingly easy ability for recipients to distinguish between senders who intentionally hide their identity from those who do not. Once it is equally easy for recipients to distinguish anonymous and non-anonymous senders, the spam problem will work itself out.

DISCLOSURE OF INVENTION

Accordingly, it is an object of the present invention to provide an email sender verification system.

Briefly, one preferred embodiment of the present invention is a method for email sender verification. A tag is included in an email, wherein the tag contains an identity datum for a sender of the email that is also stored in association with an email address of the sender at a server that is physically remote from both the sender and recipient. The email is then sent via a network, wherein a sender address becomes associated with the email. At least the identity datum, taken from the tag, is then provided to the server to retrieve the email address of the sender. The email address is then compared with the sender address, thereby verifying that the email did come from the sender when these match.

An advantage of the present invention is that it assist users in voluntary verification when using the Internet, email and the web, and other online applications.

Another advantage of the invention is that it permits graduated enforcement, permitting simple verification or verification confirmed by tracing, and permitting the data used for verification to be publicly available, semi-privately available, or entirely private and known only to an entity providing services to an email sender.

And another advantage of the invention is that it may be implemented easily and scale ably, by adding as little as a single invention specific server to an existing network, such as the internet, and then employing this with either existing email agents and enhanced email servers or directly using merely enhanced email agents.

Some initial applications include: effective management of non-spam email, support for the cataloging of web sites and pages, and interlinking systems with an email header syntax.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended tables and figures of drawings in which:

TBL. 1 is an example of RFC 822 extension encoding.

TBL. 2 is an example of an email header with a "phone" email sender verification (ESV) type.

TBL. 3 is an example of an email header with a "private key" ESV type.

TBL. 4 lists database transactions related to the ESV service.

TBL. 5 lists example representations in an ESV header.

TBL. 6 is an example of an ESV header embedded in an HTML page.

TBL. 7 is an example of an HTML page with ESV classification.

TBL. 8 is an example of an Interlink message.

TBL. 9 is an example of an ESV Interlink for data sharing.

TBL. 10 is an example of ESV secure data store access with interlinking.

Figure 1:
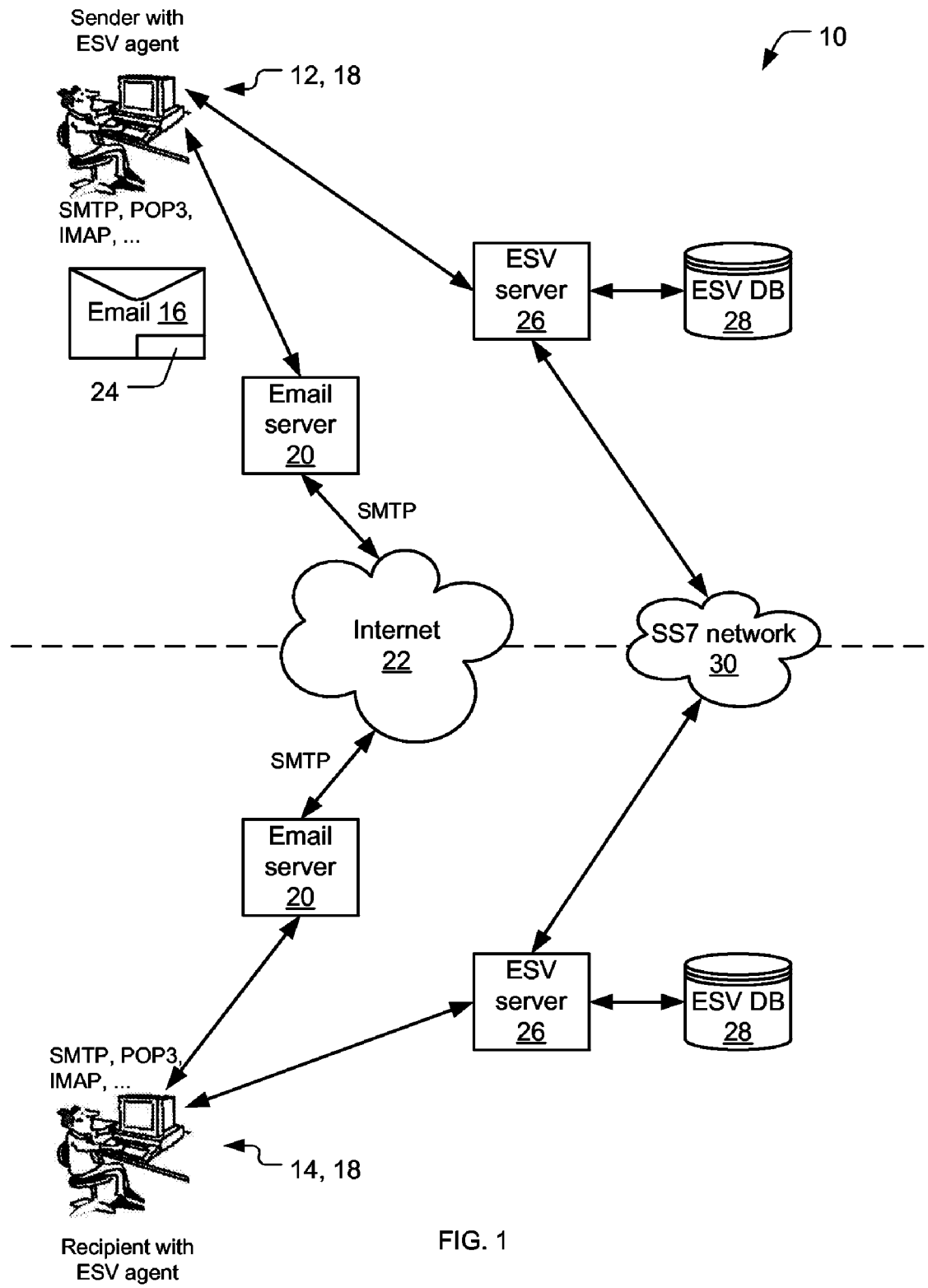
Figure 2:
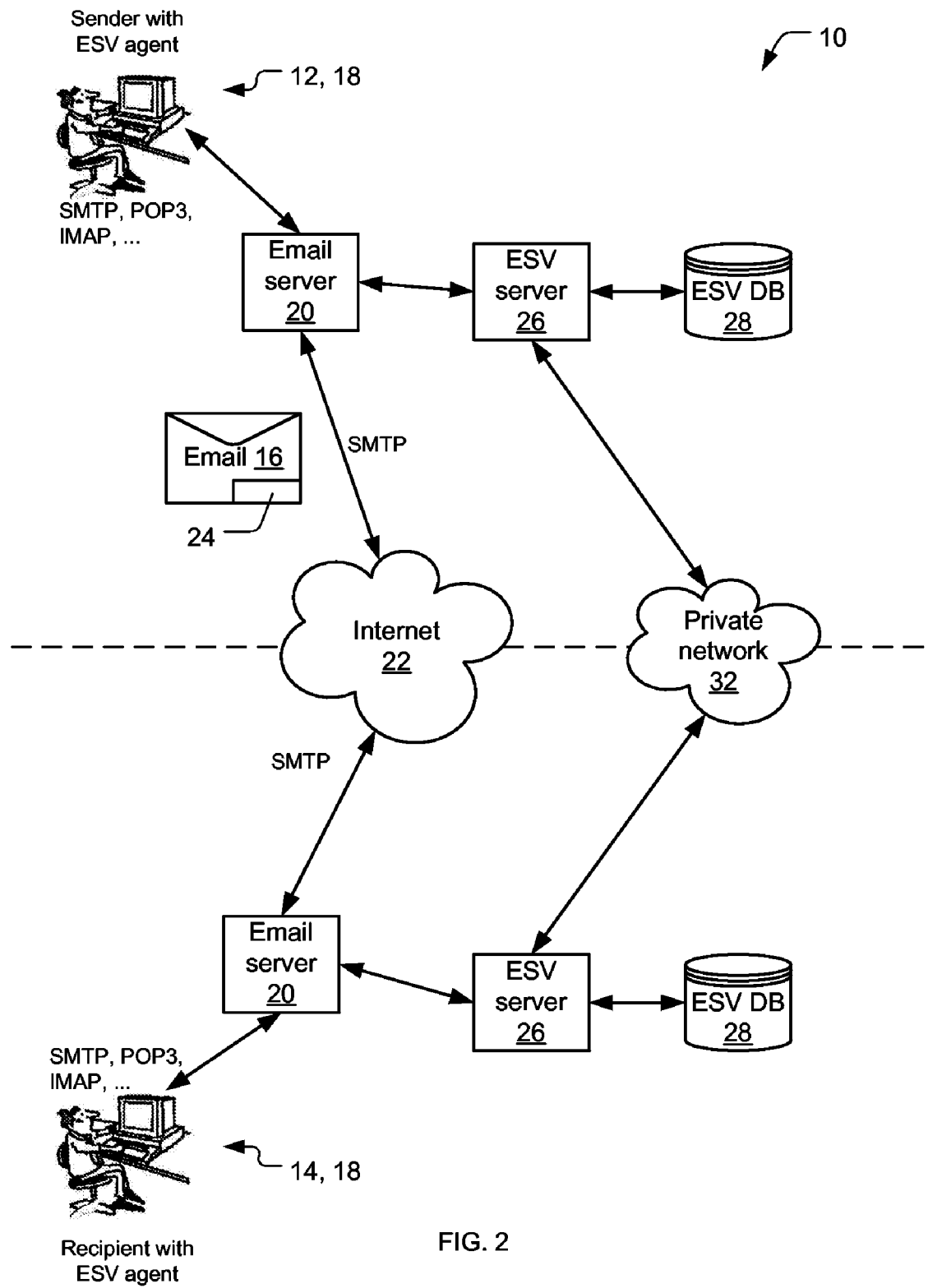
Figure 3:
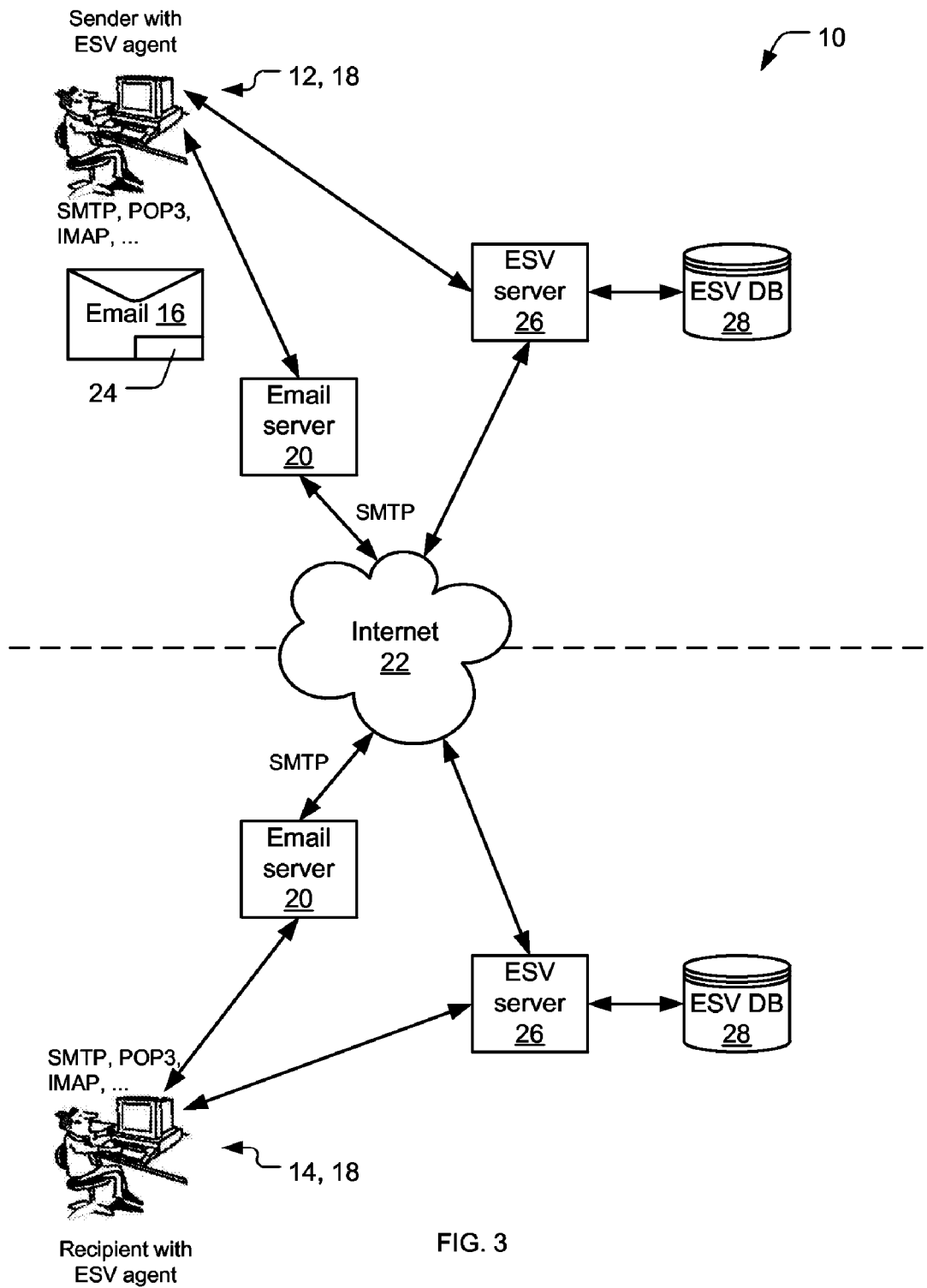

FIG. 1-3 show examples of some suitable architectures for the ESV system, wherein: in FIG. 1 the ESV servers communicate via a signaling system seven (SS7) network; in FIG. 2 the ESV servers communicate via a private network (other than a SS7 network); and in FIG. 3 the ESV servers communicate via the Internet.

Figure 4:
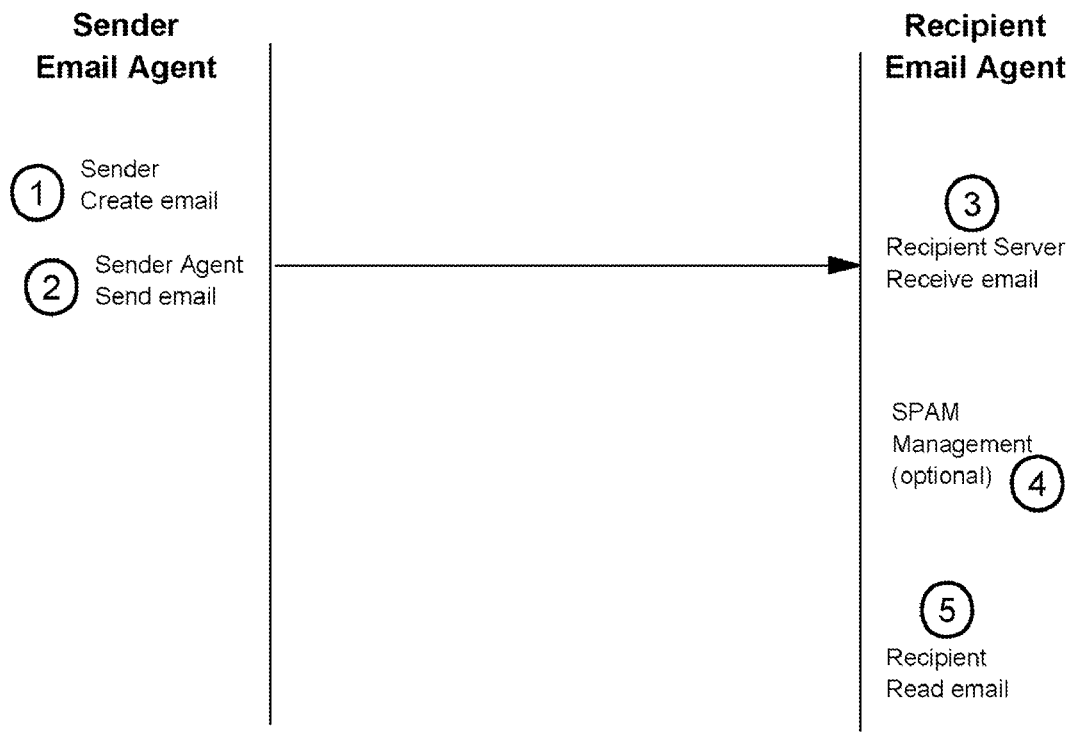

FIG. 4 (prior art) shows a simplified representation of the current Internet email system.

Figure 5:
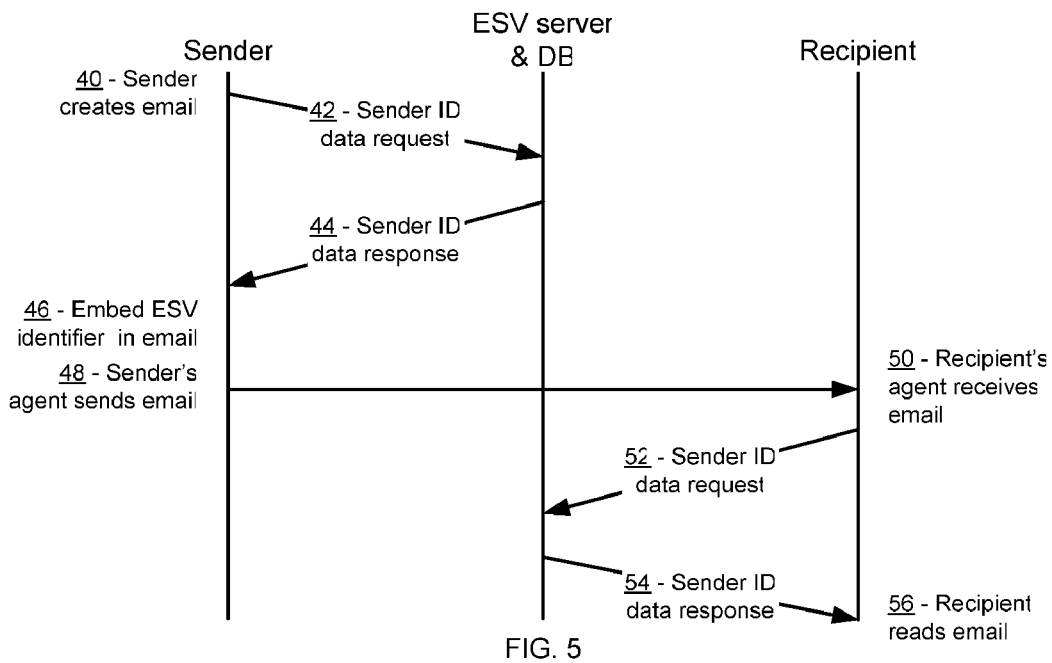
Figure 6:
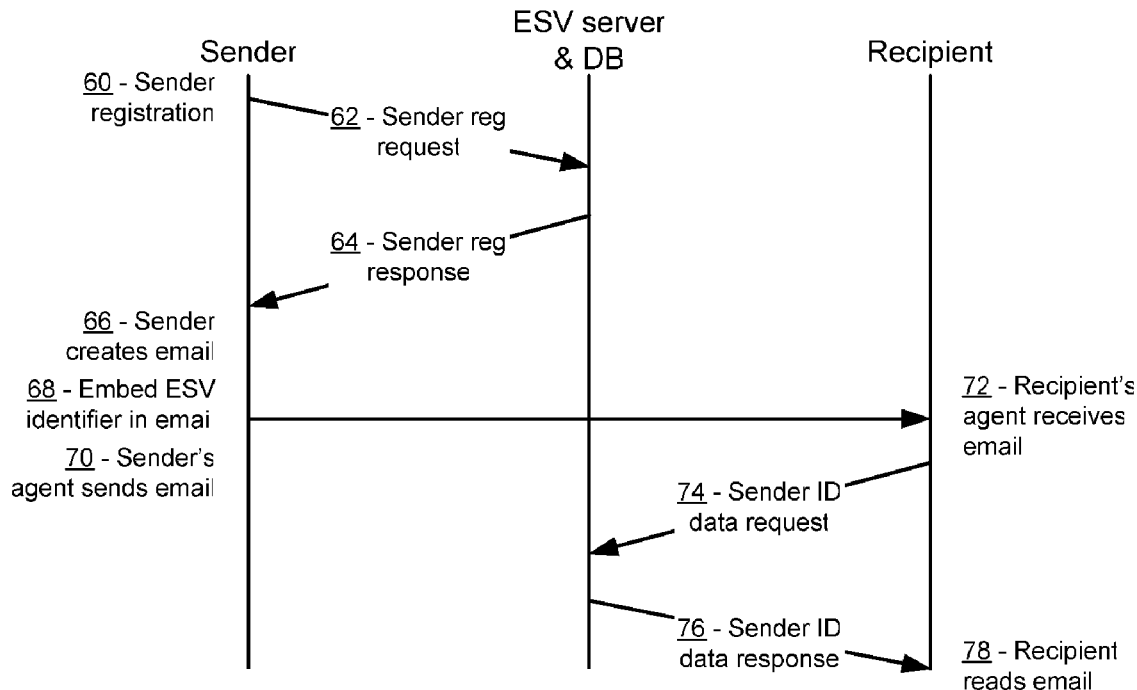
Figure 7:
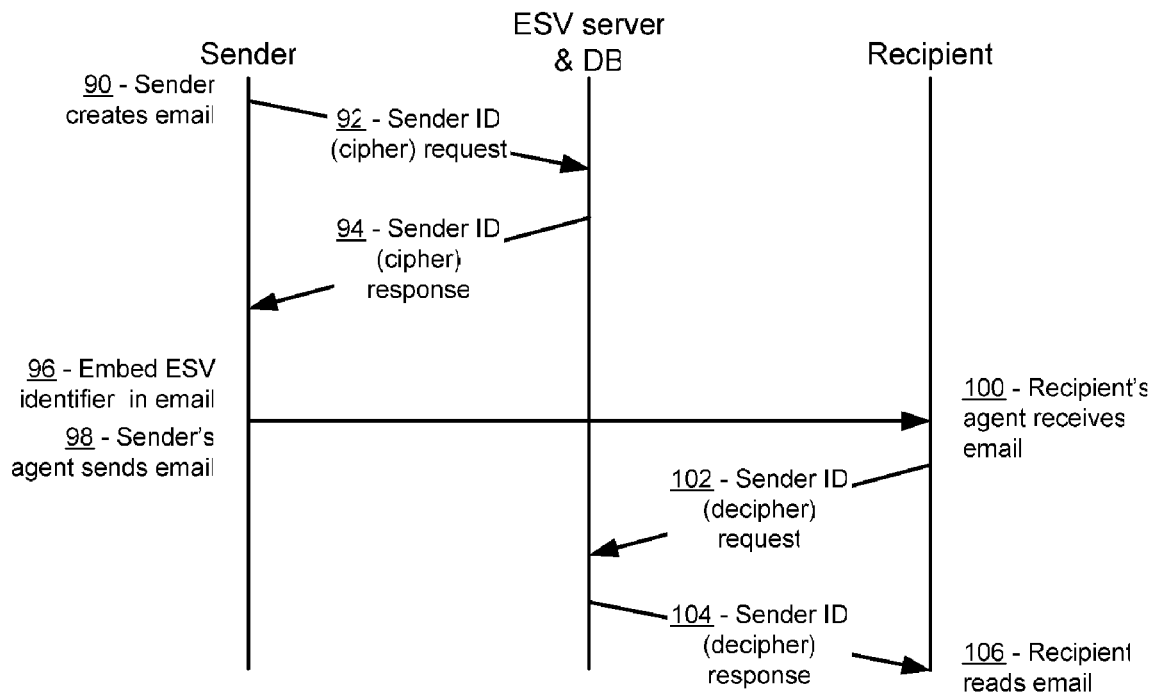
Figure 8:
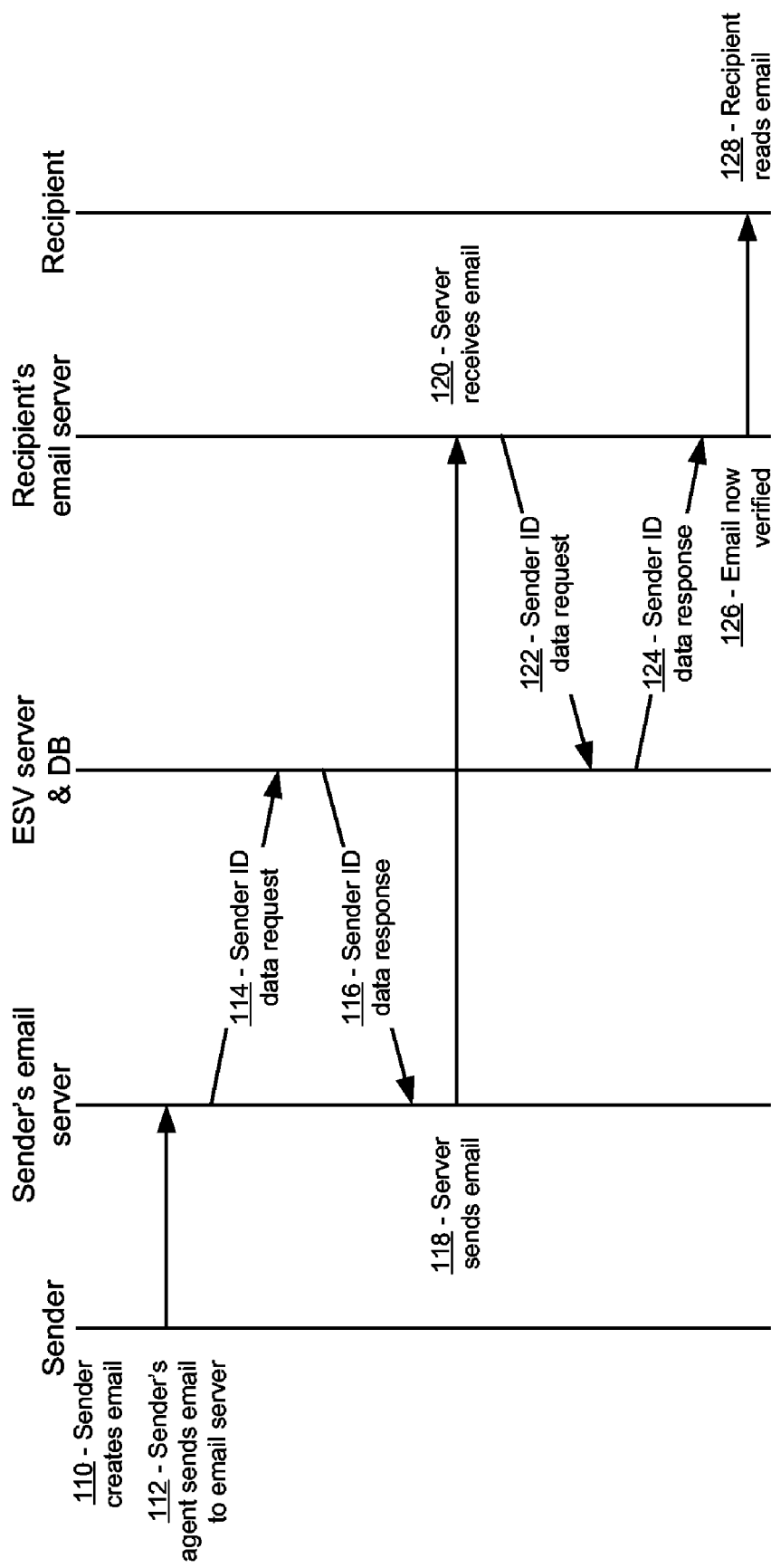

FIG. 5-8 show the flows of information in example embodiments of the ESV system, wherein: FIG. 5 and 6 show examples where a telephone number is associated with the email in plain text; FIG. 7 depicts an example using an encrypted identifier, using a private key maintained only on the ESV server of the sender; and FIG. 8 depicts an example where the ESV servers permit non-ESV enabled email agents to be used.

Figure 9:
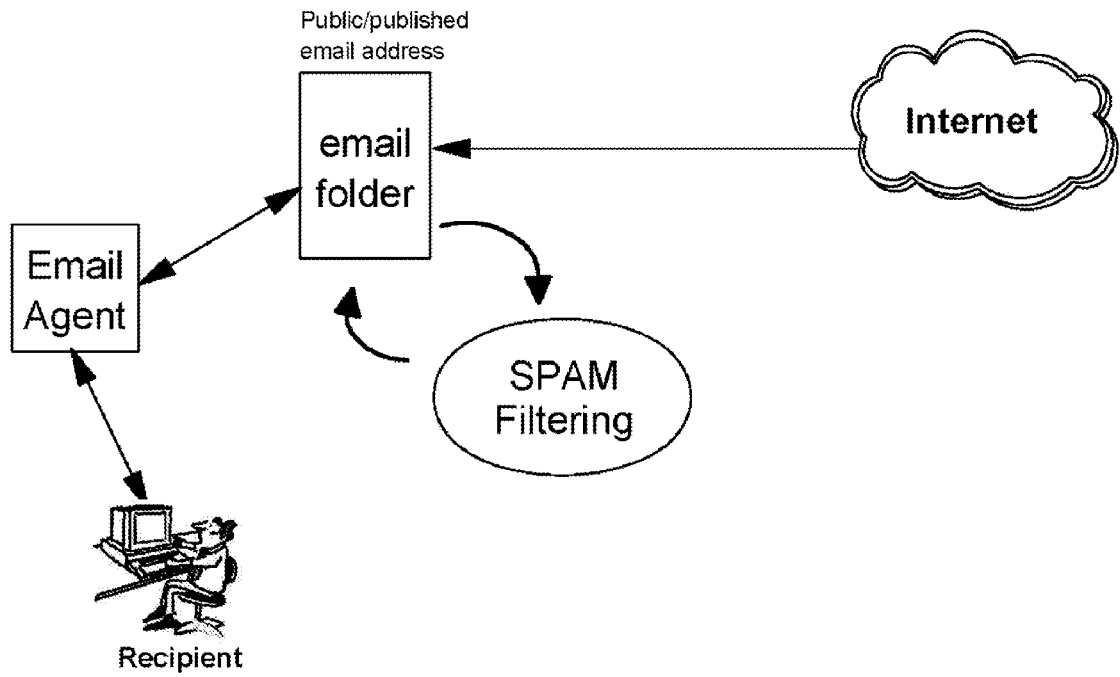

FIG. 9 (prior art) shows traditional email processing on the recipient side.

Figure 10:
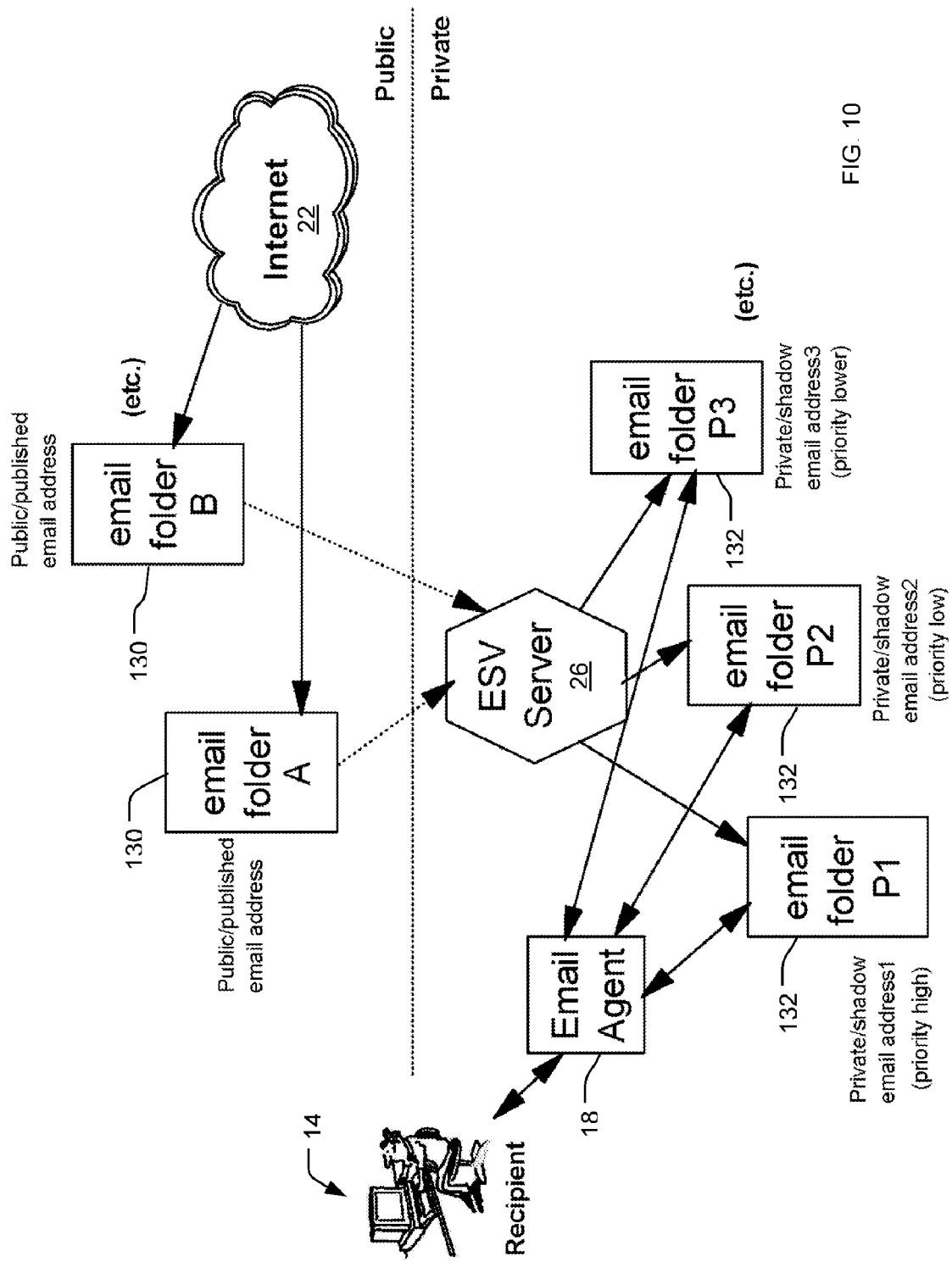

FIG. 10 shows a more sophisticated embodiment of the ESV system on the recipient side.

Figure 11:
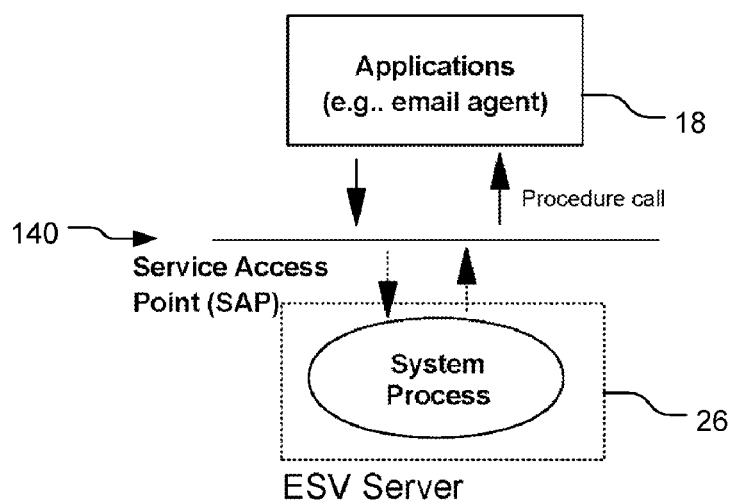

FIG. 11 shows details of the interface between the email agent (of a sender or a recipient) and the ESV server in the ESV system.

Figure 12:
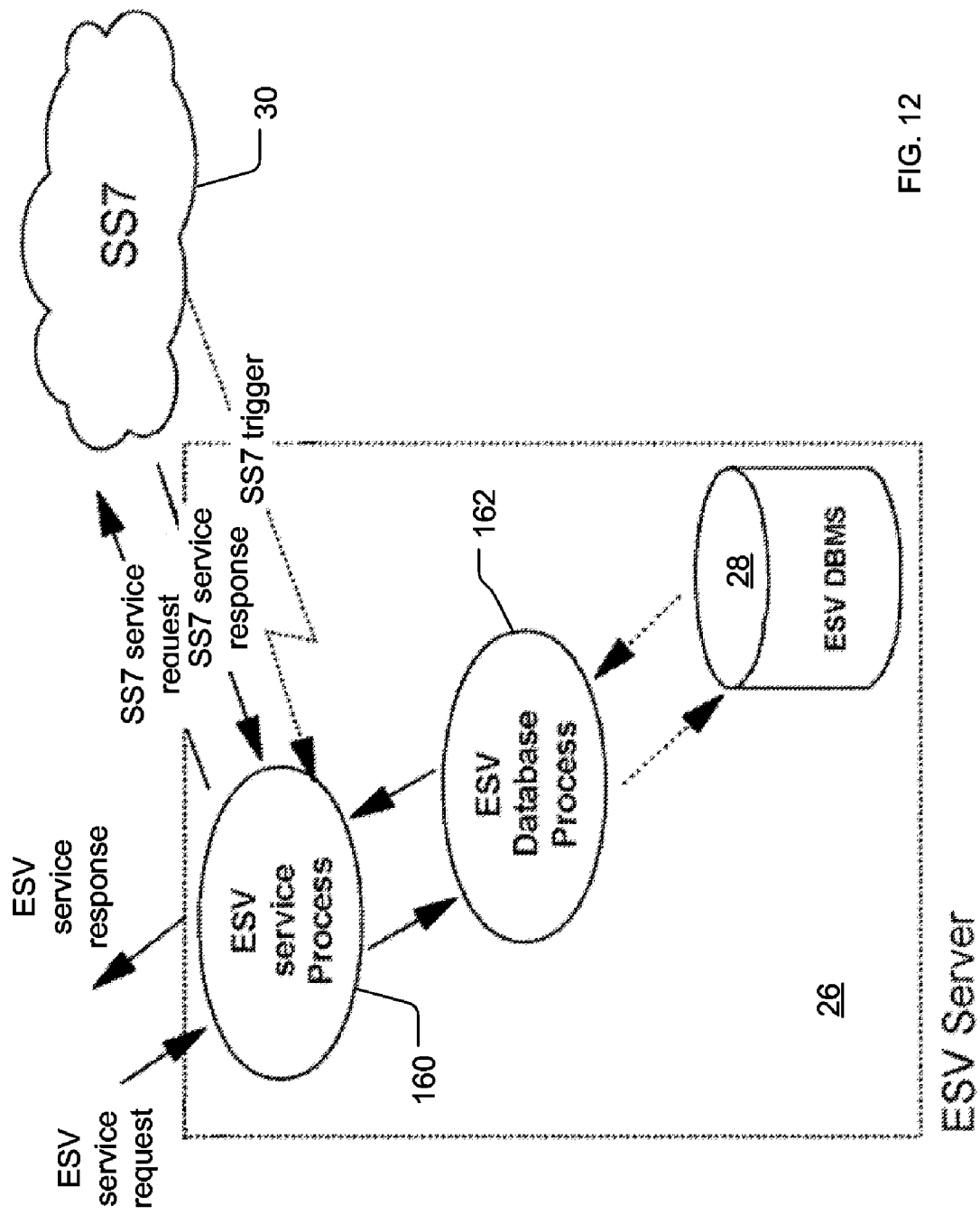
Figure 13:
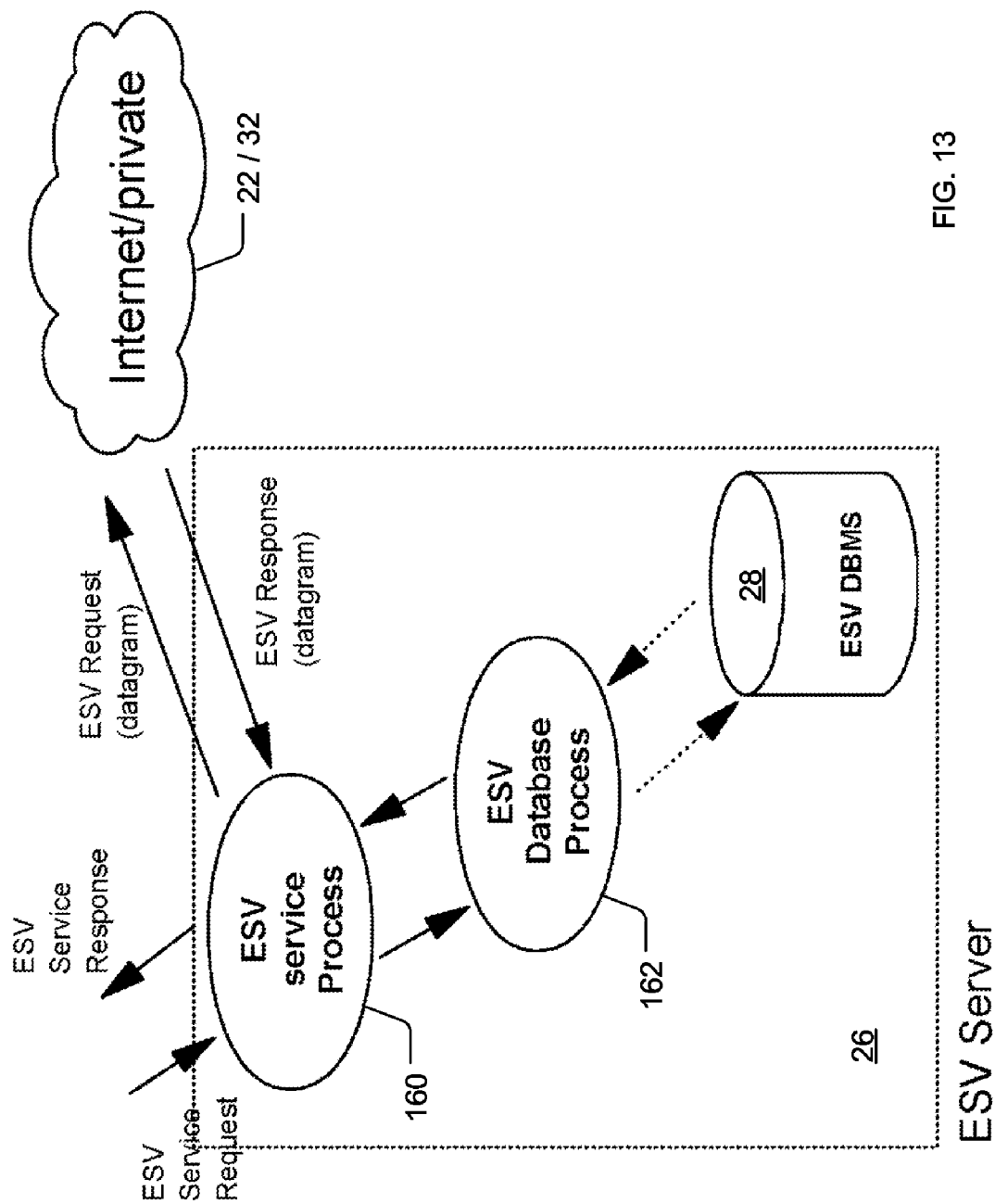

FIGS. 12 and 13 show implementation details of some ESV systems, wherein: FIG. 12 shows such using the SS7 network; and FIG. 13 shows such using either a private network or the Internet.

Figure 14:
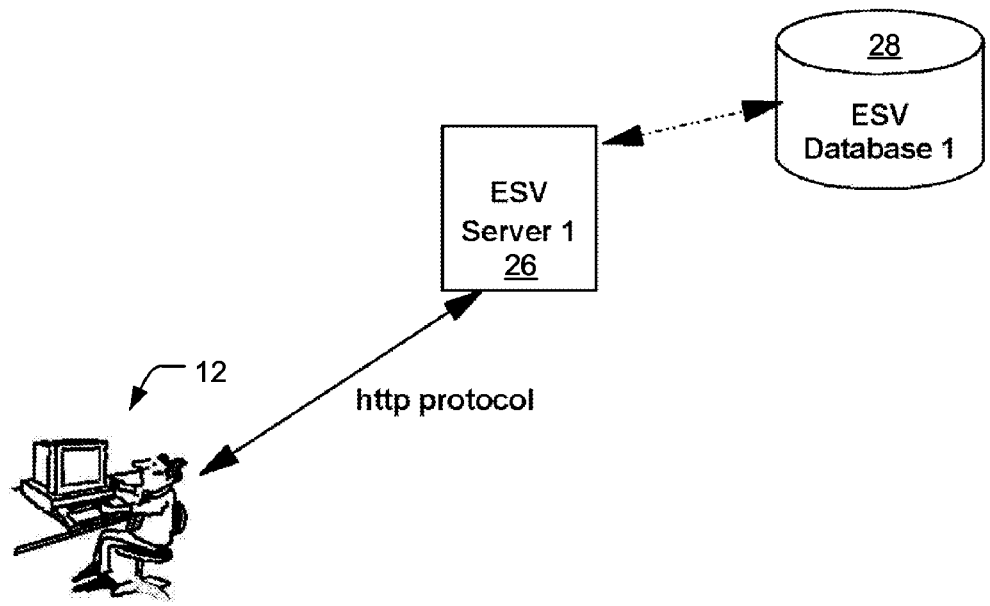

FIG. 14 conceptually shows one configuration for the ESV system to update the identity profile information of the sender.

Figure 15A:
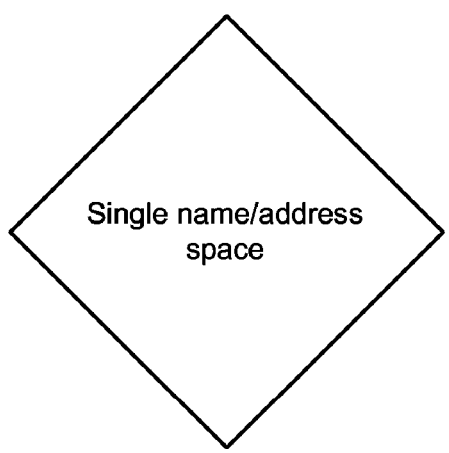
Figure 15B:
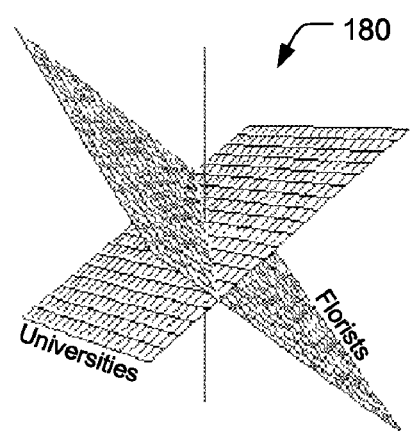

FIG. 15*a* (prior art) depicts the current DNS and domain based Internet, without any automated classification support and FIG. 15*b* depicts how an ESV name space allows automated classification of Internet addresses, hosts, domains, and websites based on verifiable categories and attributes.

Figure 16:
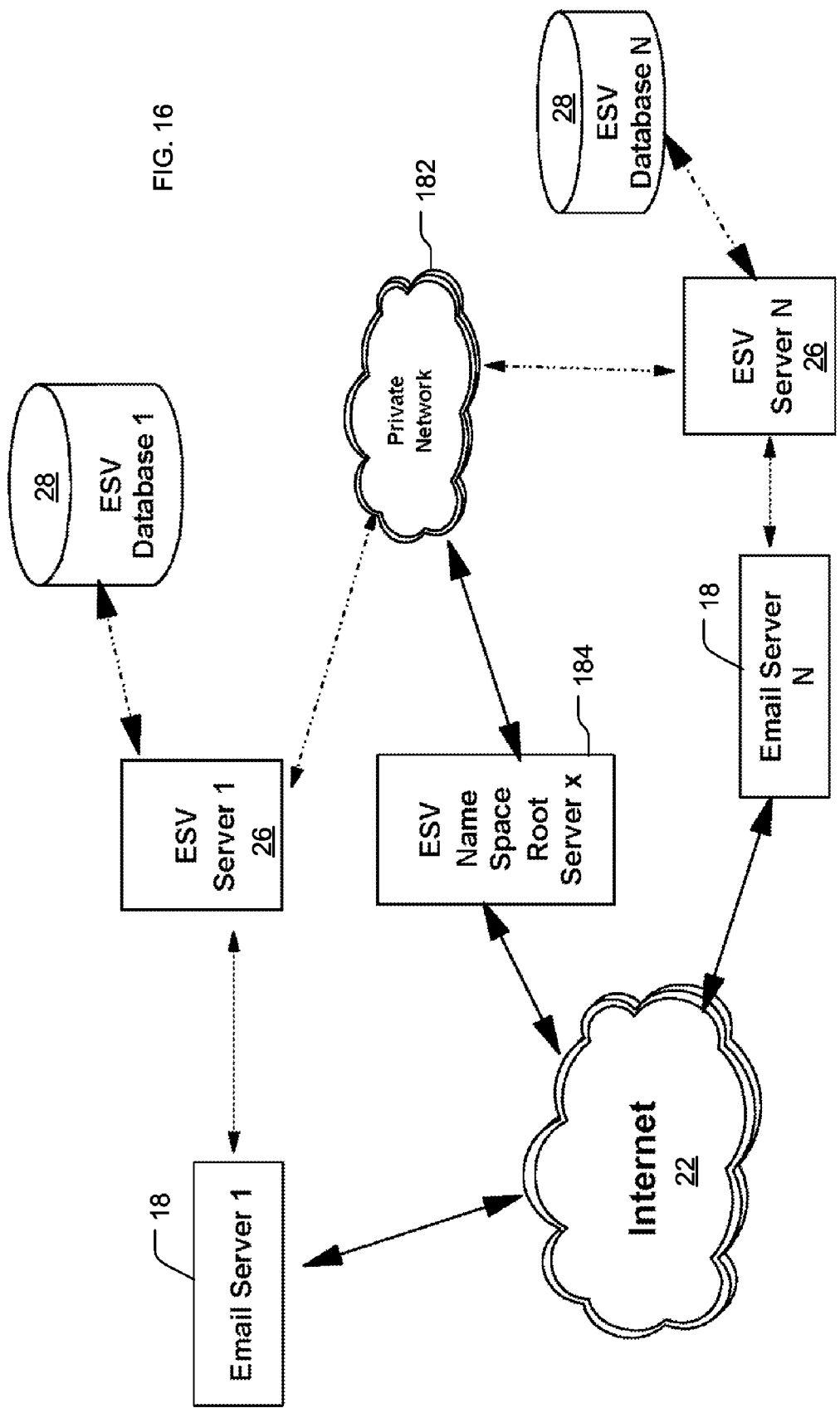

FIG. 16 shows a system architecture for the ESV name space.

Figure 17:
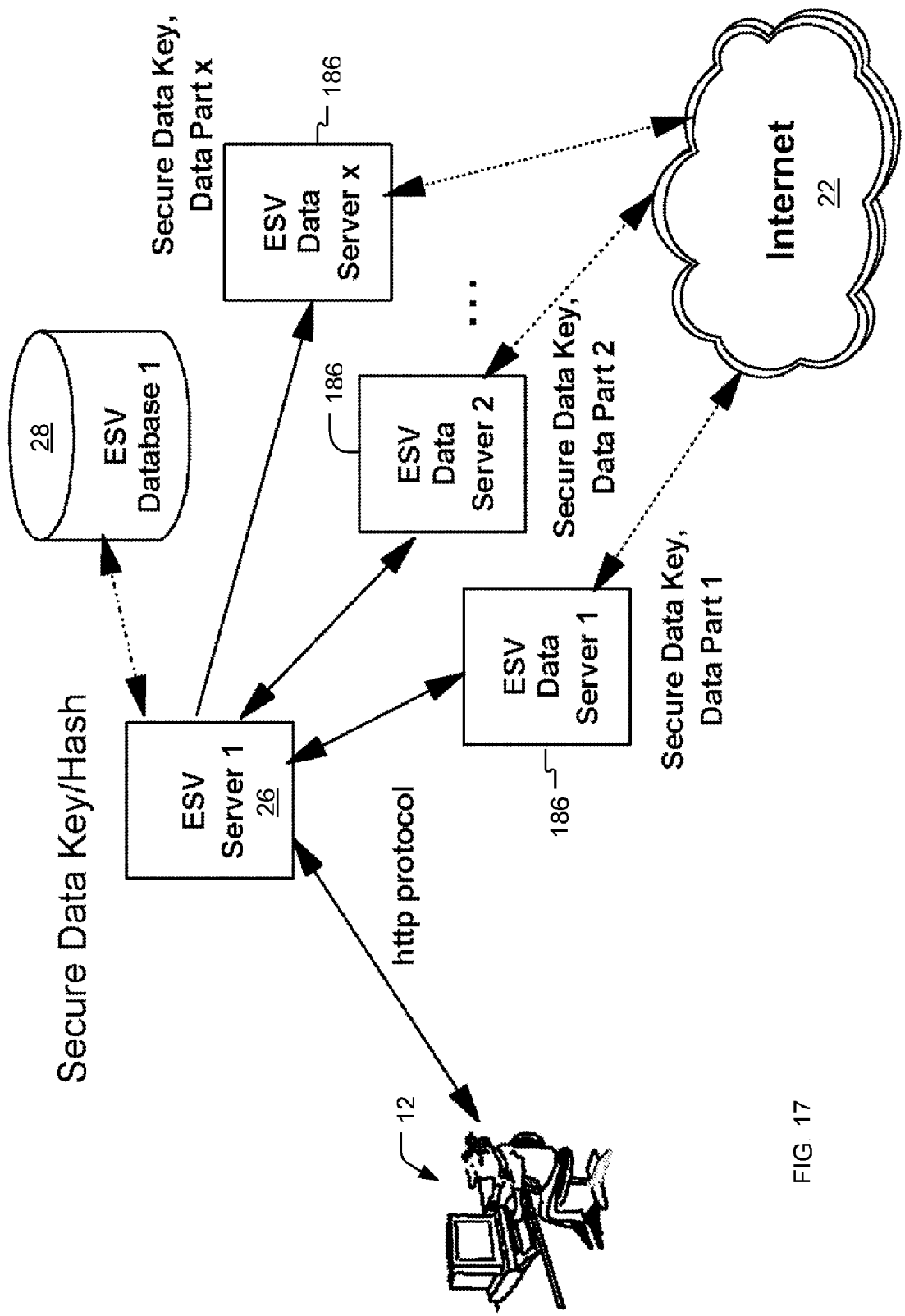

FIG. 17 shows how the ESV system can also support an ESV Secure Data Store.

In the various figures of the drawings, like references are used to denote like or similar elements or steps.

BEST MODE FOR CARRYING OUT THE INVENTION

A preferred embodiment of the present invention is an email sender verification (ESV) system. As illustrated in the various drawings herein, and particularly in the views of FIG. 1-3, preferred embodiments of the invention are depicted by the general reference character 10.

The proposed ESV system 10 is based on the recognition that the current simplicity of email needs to be preserved, while introducing an effective method for managing spam. The uncontrolled growth of spam is based on the anonymity afforded to the sender by the current email system. Simple automated sender verification or sender traceability should therefore be sufficient to drastically reduce or even eliminate the current out-of-control spam situation.

The ESV system 10 leverages the already deployed email infrastructure to provide plain-text (non-encrypted) sender identification and traceability, while allowing flexible and gradual integration of new network service management and administration capabilities into the network. Important features provided by this approach include permitting control by the sender (user) of their own identity information, providing a distributed architecture with localized aggregation of related data, and support for technologies to manage privacy.

FIG. 1-3 show examples of some suitable architectures for the ESV system 10. A sender 12 and a recipient 14 use the ESV system 10 to prepare, send, receive, and verify an email 16. The sender 12 and the recipient 14 each use respective email agents 18 and email servers 20 (conventional or ESV enabled, as discussed presently) to send the email 16 via the Internet 22 in largely conventional manner.

In unconventional manner, however, the email agent 18 or email server 20 used by the sender 12 embeds sender identification or sender verification information (an ESV tag 24) into the email 16 and the email agent 18 or email server 20 used by the recipient 14 uses this ESV tag 24 to verify that the email 16, in fact, came from the sender 12. The email agent 18 may be part of any email-enabled device, such as a workstation, desktop computer, notebook computer, personal digital assistant (PDA), cell phone, Internet-enabled appliance, or browser-capable device.

The ESV tag 24 can include a well-known item of public identity data that is already in use, such as a telephone number of the sender 12, or can include an item of quasi- or completely-private identity data, such as a numeric or alphanumeric key supplied by the ESV system 10 or by a third party based on a digital certificate, driver license number, bank account number, passport number, etc. The specific choice of the ESV tag 24 can thus be based on a desired level of assurance, authenticity, privacy, or other criteria. By embedding such third-party verifiable, plain-text, or encrypted information in emails, the senders of the emails become independently verifiable. Since this provides the clear benefit, among others, of permitting email recipients to separate out spam easily, a majority of regular email senders can be expected to voluntarily embed sender identification information in their emails.

In addition to providing simple verification, the ESV system 10 can provide traceability, for more rigorous verification of the sender 12 and to provide additional security features. For this the ESV system 10 can be viewed as involving three major stages, ESV Registration, ESV Identification, and ESV Tracing. In the ESV Registration stage the sender 12 registers with a local ESV server 26, and establishes a profile there with identify information about themselves in an ESV database 28. The ESV tag stage generates and embeds the ESV tag 24 in any email 16 that the sender 12 wishes to be verifiable or traceable. The sender 12 then sends the email 16. The ESV Tracing stage permits the recipient 14 of such an email 16 to access an ESV server 26 and ESV database 28 to verify the sender 12 and trace the email 16.

The ESV Registration stage can use identify information that is simple to generate the ESV tag 24, e.g., a telephone number verifiable by the telephone service provider, or it can use identify information that is more complex, e.g., one or more values generated by a biometric identity system. The ESV databases 28 thus can be managed by the senders 12 themselves in an ongoing manner, with the identify information merely being information specific to the respective senders 12 and verifiable using either a manual or automated system.

The ESV Identification stage establishes a link, the ESV tag 24, between the email address of a sender 12 and their identity information. One example of an ESV tag 24 is a telephone number with RFC 822 extension encoding. TABLE 1, below, depicts a simple example.

TABLE 1

| | |
|---|---|
| X-esv-sysid: 10.402 | ; e.g., <Zone id>.<system id> |
| X-esv-id: 1-123-444-5555 | ; e.g., <phone no> |
| X-esv-type: phone | |

RFC 822 tags and their fields in this example form an ESV tag 24 that a sender 12 can include in an email 16. The tag X-esv-sysid serves to uniquely identify the particular ESV server 26 (within a private network, if applicable) that has definitive information about the sender 12 of the email 16, i.e., that has a profile for this sender 12 in its ESV database 28. The fields in this X-esv-sysid tag are <Zone id> and <system id>. The <Zone id> field specifies a country, or unique administrative domain and the <system id> field specifies a particular ESV server 26 within that zone. In total, these fields in the X-esv-sysid tag provide an Internet address or DNS-based (Domain Name Service) host name for the ESV server 26 that needs to be used. The X-esv-id tag includes the actual data that can be used to establish the identity of the sender 12 with the ESV server 26, and in this example that data is simply a single field containing a telephone number. Since the data in the X-esv-id tag can potentially have different types, however, a X-esv-type tag is further provided to define the type of sender identity being used and thus the verification process to ultimately apply.

The ESV Identification stage may simply use information previously obtained by the email agent of the sender 12 during the ESV Registration stage, or it may dynamically obtain the information for the ESV tag 24 from an ESV server 26 each time it is needed, allowing for enhanced authentication and validation processes.

Since email is an universal Internet application, the ESV Registration stage can also be an anchor point for aggregating other personalization functionality. For example, web searching can be personalized with user preferences and historical usage patterns, such as subjects (e.g. economics, psychology, etc.) that the user is interested and not interested in. These preferences can be incorporated as part of the preference for the user. Another application is storing personal identity information, either directly in encrypted form or as addresses of locations from which such information can be obtained. Examples include biometric identity data, credit card numbers, passwords, etc.

The ESV Tracing stage begins upon receipt of an email 16 by an email agent 18. The sender 12 of the email 16 is authenticated by establishing that the association between their email address and the ESV tag 24 embedded in the email 16 is genuine. This is preferably accomplished in the following manner:

The email agent 18 of the recipient 14 contacts the definitive ESV server 26 (that of the sender 12), providing it with the sender address data and the ESV tag 24 from the email 16, and, optionally, with tracking path data from the header of the email 16.

The ESV server 26 then verifies the association between the sender address and the ESV tag 24 by querying its ESV database 28.

Next, the tracking path data is examined to verify that the email 16 was not tampered with en-route between the sender 12 and the recipient 14.

Since it is possible to spoof the sender identifying information in an email, simply checking a sender address against the ESV tag 24 is not sufficient. However, the tracking path data in the email header, e.g., in the <Received:> field, is a simple way to detect spoofing. The tracking path data accumulated by the email as it passes through intermediate network nodes is outside the control of an email sender who is engaged in spoofing. Thus, the email agent 18 of the recipient 14, alone or in conjunction with the definitive ESV server 26, can verify the authenticity of the sender email address by parsing the <Received:> header fields in the email 16. The level of assurance of an identify can be enhanced here by establishing that only known connections to SMTP relay hosts adjacent to the sender 12 of the email 16 were used.

Sample headers of emails 16 along with example ESV header field extensions are given in TABLE 2 and TABLE 3.

TABLE 2

Sample email header with a "phone" ESV type

Return-Path: <george@strategygroup.net>
Errors-To: <george@strategygroup.net>
To: gary@strategygroup.net
Subject: Meeting
Message-ID: <OFB297AEF7.A5B63537-ON88256DFD.007AF2D6@strategygroup.net>
From: george@strategygroup.net
Date: Mon, 15 Dec 2003 14:23:32 -0800

TABLE 2-continued

Sample email header with a "phone" ESV type

X-esv-sysid: 10.204
X-esv-id: 1-650-555-1212
X-esv-type: phone

Another method for providing higher-level assurance against tampering of the emails en-route is to use a simple private-key based encryption system (see e.g., FIG. 7, TBL. 3). The X-esv-id tag information is encrypted using a private key by the ESV server 26 of the sender 12. Upon receipt, the email agent 18 of the recipient 14 contacts the ESV server 26 of the sender 12 to decipher the X-esv-id tag. The X-esv-id tag information here, for example, can simply be the email address of the sender 12, providing a simple means of validating the sender 12 without disclosing any private information (such as a phone number). In this variation of the ESV system 10 the private key is needed only on the ESV server 26 of the sender 12, and thus can be changed periodically to provide enhanced security, besides eliminating the need for a public key infrastructure (PKI) and the necessary distribution and management of public keys that such entails.

TABLE 3

Sample email header with a "private key" ESV type

Return-Path: <george@strategygroup.net>
Errors-To: <george@strategygroup.net>
To: gary@strategygroup.net
Subject: Meeting
Message-ID: <OFB297AEF7.A5B63537-ON88256DFD.007AF2D6@strategygroup.net>
From: george@strategygroup.net
Date: Mon, 15 Dec 2003 14:23:32 -0800
X-esv-sysid: 10.204
X-esv-id: qesitoswqda39ae6dkivft
X-esv-type: private key Summarizing, in its simplest form the gist of the inventive ESV system 10 is as follows. Use an already well-known plain-text identifier for a sender 12, such as a telephone number, as a key for aggregating identity information including email addresses. To permit an email 16 to be verifiable, embed an ESV tag 24 associated with the email address of the sender 12 into the email 16. Independently (from the email 16) access the identity information for the sender 12 in an ESV database 28 to verify the identity of the sender 12. This provides a simple and transparent means for recipients 14 to distinguish between verifiable emails 16 and non-verifiable (and probable spam) emails.

Optionally, when a dynamic ESV tag 24 is used, the senders 12 of emails 16 can be permitted to set usage policies and patterns for their email addresses and identities on the ESV server 26. For example, one policy can be that a password accompany a request for a each ESV tag 24. Before an ESV tag 24 is generated the ESV system 10 can then verify that the intended email transmission will comply with the wishes of the registered owner of the email address (in terms of volume and frequency, for example), and otherwise notify the owner and a system administrator—without providing an ESV tag 24 for sending what may be a forged email and the email transmission is prevented.

Continuing with FIG. 1-3, these show three example architectures using the ESV system 10 for a sender 12 to prepare and send an email 16 and for a recipient 14 receive that email 16. The email 16 travels, conventionally, from the email agent 18 of the sender 12 via the Internet 22 to the email server 20 of the recipient 14. Unlike prior art schemes, however, the email agent 18 (in this embodiment) of the sender 12 and the email agent 18 (in this embodiment) of the recipient 14 communicate with ESV servers 26 to permit verifying the sender 12 of the email 16.

The ESV servers 26 and ESV databases 28 that are used by the sender 12 and the recipient 14 may be the same, but this need not and often will not be the case. FIG. 1-3 therefore show embodiments of the ESV system 10 that are suitable when these are different.

The embodiments in FIG. 1-3 are distinct in how the ESV servers 26 communicate with one another. In FIG. 1 the ESV servers 26 communicate via a signaling system seven network (SS7 network 30); in FIG. 2 the ESV servers 26 communicate via a private network 32 (other than a SS7 network); and in FIG. 3 the ESV servers 26 communicate via the Internet 22 (i.e., via a public rather than a private network). The SS7 network 30 provides an efficient telephony-based means of verifying the email address in association with a telephone number of a sender 12, provides a simple way to make email and web addresses part of telephone directory services.

One benefit of using the private network 32 is not having to load the SS7 network 30 for ESV applications. Another benefit is permitting the deployment of networks that are more suited for verification services.

Having the ESV servers 26 communicate via the Internet 22 is conceptually the simplest, but can be subject to many of the same security and timeliness concerns that are common to the Internet today.

The ESV servers 26 are connected to their respective ESV databases 28, which both contain definitive sender identify information. An ESV database 28 contains the subscriber identity information that is maintained and managed by sender 12 (the subscriber). A sender 12 always has the option of excluding the ESV tag 24 from an email. In which case, the recipient 14 has the option of not accepting the email—similar to anonymous call filtering that works with the caller-id feature for telephone calls today.

FIG. 4 (prior art) shows a simplified representation of the current Internet email system. One of the strengths of this is simplicity. However, the anonymity made possible by the simple architecture it uses today has resulted in misuse and the current unmanageable spam situation. Currently an email is simply forwarded to the recipient using the Internet address system and the domain name service (DNS), without any limitations or restrictions other than for syntax requirements and network accessibility.

In contrast, FIGS. 5-8 show the flows of information in example embodiments of the ESV system 10. FIGS. 5 and 6 (and TBL. 2) show examples where a telephone number is associated with the email 16 in plain text. FIG. 7 (and TBL. 3) depict an example using an encrypted identifier, using private key maintained only on the ESV server 26 of the sender 12. FIG. 8 depicts an example where the ESV servers 26 permit non-ESV enabled email agents 18 to be used. The emails 16 in all of the examples are still, however, transported in conventional manner.

In FIG. 5 the ESV tag 24 is obtained dynamically. In a step 40 the sender 12 uses their email agent 18 to create the email 16. The email agent 18 then, typically automatically, in step 42 sends a request to the ESV server 26 for an ESV tag 24 (or for data to use in one). In step 44 the ESV server 26 then provides this, based on what is in its ESV database 28. In step 46 the ESV tag 24 is added to the email 16 and in step 48 it is sent to the recipient 14 in essentially conventional manner. In step 50 the email agent 18 of the recipient 14 receives the email 16, and in step 52 it sends a request including all or part of the ESV tag 24 to the ESV server 26 that was specified in the email 16. The ESV server 26 then compares the information in this request with the data in its ESV database 28, and in step 54 sends a suitable response (e.g., "valid" or "invalid") back to the email agent 18 of the recipient 14. Finally, in step 56, the recipient 14 can read (or not read) the email 16, based on the response from the ESV server 26.

In FIG. 6 the ESV tag 24 is not obtained dynamically, but otherwise differs little from the approach just described. In an ESV Registration stage, as discussed previously, the sender 12 registers. In a step 60 they draft a request including suitable identity information about themselves, and in step 62 they send that request to their chosen ESV server 26. The ESV server 26 then stores the information it receives about the sender 12 in its ESV database 28, and in step 64 sends a response including an ESV tag 24 (or for data to use in one) back to the email agent 18 of the sender 12, which is stored for later use.

At some indeterminate time later, in step 66, the sender 12 creates an email 16 and in step 68 their email agent 18 embeds the ESV tag 24 into that email 16, based on the data previously received and stored from the ESV server 26. In step 70 the email 16 is sent to the recipient 14, in essentially conventional manner. In step 72 the email agent 18 of the recipient 14 receives the email 16, and in step 74 it sends a request including all or part of the ESV tag 24 to the ESV server 26 that was specified in the email 16. The ESV server 26 then compares the information in this request with the data in its ESV database 28, and in step 76 sends a suitable response (e.g., "valid" or "invalid") back to the email agent 18 of the recipient 14. Finally, in step 78, the recipient 14 can read (or not read) the email 16, based on the response from the ESV server 26.

In FIG. 7 the ESV tag 24 is again obtained dynamically, but uses a private key (see e.g., TBL. 3) from the ESV server 26. In a step 90 the sender 12 uses their email agent 18 to create the email 16. Their email agent 18 then, typically automatically, in step 92 sends a request to the ESV server 26 for an ESV tag 24 (or for data to use in one), and in step 94 the ESV server 26 provides this back to the email agent 18 of the sender 12 in encrypted form, having based what it sends on what it has in its ESV database 28 for the sender 12. In step 96 the email agent 18 of the sender 12 adds the ESV tag 24 to the email 16 and in step 98 it is sent to the recipient 14 in essentially conventional manner. In step 100 the email agent 18 of the recipient 14 receives the email 16, and in step 102 it sends a request including all (or at least the part encrypted part) of the ESV tag 24 to the ESV server 26 that was specified in the email 16. The ESV server 26 then deciphers what it has received in this request and compares it with the data in its ESV database 28. In step 104 the ESV server 26 sends a suitable response back to the email agent 18 of the recipient 14 (e.g., "valid" or "invalid"). Finally, in step 106, the recipient 14 can read (or not read) the email 16, based on the response from the ESV server 26.

In FIG. 8 the ESV tag 24 is obtained dynamically, based on public data or a private key, here using email agents 18 that can be entirely conventional and using the email servers 20 of the sender 12 and the recipient 14 to handle the ESV tag 24. In a step 110 the sender 12 uses their email agent 18 to create the email 16 and in step 112 they use their email agent 18 to send the email 16 to their email server 20. In step 114 their email server 20 requests the ESV tag 24 from their ESV server 26, and in step 116 the ESV server 26 provides the ESV tag 24 to the email server 20 of the sender 12. In step 118 the email server 20 of the sender 12 now adds the ESV tag 24 to the email 16 and sends it to the email server 20 of the recipient 14. In step 120 the email server 20 of the recipient 14 receives the email 16, and in step 122 the email server 20 of the recipient 14 requests validation of the ESV tag 24 in the incoming email 16 from the ESV server 26. In step 124 the ESV server 26 sends a suitable response back to the email server 20 of the recipient 14 (e.g., "valid" or "invalid"). Based on this, in step 126 the email server 20 of the recipient 14 flags the email 16 (e.g., prefixing the subject with text "[Spam]" or "[Verified]") and sends it to the email agent 18 of the recipient 14. Finally, in step 128 the recipient 14 can read (or not read) the email 16 as they wish.

By centralizing verification in this manner at the email servers 20 of either or both of the sender 12 and the recipient 14, it is possible to eliminate the need to upgrade the email agents 18 on the user's systems. It is also possible using this architecture to eliminate the need for the users to maintain independent verification profiles, letting such be set by administrators of the email servers 20 instead. In addition to permitting easy adoption of the ESV system 10, this permits the operators of the email servers 20 (i.e., Internet service providers or in-house domain administrators) to handle essentially all adoption overhead of the ESV system 10 as a "value added" service.

It is important here to note that from the user's perspective email under the ESV system 10 works as before, with all of the additional steps being transparent. This makes adoption of the ESV system 10 easier and permits incremental deployment. If the ESV system 10 is not fully deployed end-to-end between a sender 12 and a recipient 14, everything simply works as always, albeit without an enhanced sender verification capability.

FIG. 9 (prior art) shows traditional email processing on the recipient side. The recipient email server stores the incoming email in a folder for access by the recipient using an email agent—a program that accesses the email folder on the server, such as MICROSOFT OUTLOOK, EUDORA, etc. Some systems optionally incorporate additional processing for managing spam (e.g., filtering, challenge-response, etc.).

In contrast, with the new ESV system 10, the email agent 18 of the recipient 14 accesses the ESV server 26 upon receipt of an email 16 to verify the identity of the sender 12. This verification confirms that the email address of the sender 12 is associated with the ESV tag 24 in the ESV database 28. If there are frequent email exchanges with a sender 12, identity verification information for that sender 12 may be kept in a local ESV database 28 at the ESV server 26 of the recipient 14. If the identity of the sender 12 is verified, the email 16 is classified as verified (not spam). The identify information of the sender 12 can be selectively revealed to recipient 14, based on the profile preferences that the sender 12 establishes. Once the identity of a sender 12 is verifiable, differentiated treatment of email 16 from that sender 12 is possible—similar to bulk mail and normal mail in the current U.S. postal system.

FIG. 10 shows a more sophisticated embodiment of the ESV system 10 on the recipient side. This may be implemented independently and transparent to the rest of the ESV system 10, and permits managing multiple email addresses concurrently. The enhanced management of emails 16 here is accomplished with the help of shadow (private) email addresses. The shadow email addresses are not made public (disclosed to senders 12), but instead used only by a Shadow Email Prioritization (SEP) process running in the ESV server 26 of the recipient 14. Based on the priorities and criteria selected by the recipient 14, the SEP process scans a set of public email folders 130 (A, B, . . . ; folders that do have public email addresses) and transfers the emails 16 from them into shadow email folders 132 (p1, p2, . . . ; folders that have private, shadow email addresses). The shadow email addresses work like regular email addresses, except that they are used only by the SEP process. By filtering and prioritizing the emails into separate shadow email folders, the recipient 14 is able to selectively access only email 16 in categories that they are interested in. All the normal email features (such as web access) can be implemented for the shadow email folders 132, and can be processed with any email agent 18 that the recipient 14 may use.

FIG. 11 shows details of the interface between the email agent 18 (of a sender 12 or a recipient 14) and the ESV server 26 in the ESV system 10. The email agent 18 (and other applications, if desired) access functions of the ESV server 26 through an Application Programming Interface (API, here termed a Service Access Point, SAP 140), using standard techniques such as procedure calls. Such a procedure call then, in turn, communicates to an internal system process that communicates to the different components of an ESV server 26.

FIGS. 12 and 13 show implementation details of ESV systems 10 using the SS7 network 30 (FIG. 1), a private network 32 (FIG. 2), or the Internet 22 (FIG. 3).

For embodiments the of ESV system 10 using an SS7 network 30, the ESV server 26 has an ESV service process 160 that handles the interface (SAP 140) for all external requests and an ESV database process 162 that manages all processing related to the ESV database 28. The ESV service process 160 interfaces with the SS7 network 30 using available Request, Response, and Trigger commands.

For embodiments of the ESV system 10 using either a private network 32 or the Internet 22, the ESV server 26 also uses an ESV service process 160 to handles the interface (SAP 140) for all external requests and an ESV database process 162 to manage all processing related to the ESV database 28. However, here the ESV service process 160 interfaces with the network (private network 32 or Internet 22) using available Request and Response commands.

TABLE 4

| Database transactions related to the ESV service | |
| --- | --- |
| At sender email server | In ESV database |
| Sender profile creation | Record creation |
| Email sender profile update | Record update |
| ESV verified service organization | Record read |
| ESV verified service reception | Record read |
| Email user termination | Record delete |

The identify information for a sender 12 is created in the ESV database 28 when the network service is provisioned for the sender 12 or when email service is configured. Using a web interface, the sender 12 can to manage his or her identify profile, which is used to limit the information included in the ESV database 28 and made available to associated verification services such as the ESV system 10. The sender 12 may remain anonymous, or publish detailed background about themselves as some people now do on the Internet. The information may be deleted (or taken off-line) from the ESV database 28 when the sender 12 discontinues service. The sender 12 can have the ability to change their identity information, at their discretion. The information in the ESV database 28 is read to provide the email sender verification. This permits verification in a far less complex manner than current certificate based authentication systems, because it is based on voluntary disclosures, permissions, and acceptance.

FIG. 14 conceptually shows one configuration for the ESV system 10 to update the identity profile information of the sender 12. The sender 12 connects to the ESV server 26 using a web browser, using http protocols for example, and makes the desired changes. These changes are then stored in the ESV database 28. Of course, the sender 12 can also accomplish this by email, using their email agent 18 to send an email 16 to the ESV server 26 (see e.g., FIG. 2), but a web interface can provide usability and security advantages.

In general, the ESV system 10 offers variable levels of trace-ability back to senders 12. This creates potential problems in cases where sender anonymity is needed, for example, political speech. To remedy this, anonymity can be provided through email servers 20 that are established for the specific purpose of offering anonymous ESV email service. These email servers 20 can remove all of the header information from emails 16 that contains identifiable information about senders 12, yet still include the ESV headers. An ESV header, in this case, will provide traceability up to the email server 20 of a sender 12, but not all the way to the actual sender 12.

This discussion now turns to how the ESV system 10 can allow natural extensions that have other applications, besides solving the spam email problem.

An ESV header can be enhanced to include attributes that provide additional information about the type of email content, nature of the contact, importance, subject matter attributes, level of verification provided, verification tags from third party verifiers. Examples of this type application are: content characterization: suitable for children, adult content, confidential, etc.

TABLE 5

Sample representations in an ESV header

X-esv-content-type: confidential, encrypted
X-esv-content-type: confidential, plain-text
X-esv-content-type: private
X-esv-content-type: public
X-esv-language: Japanese
X-esv-content-type: commercial
X-esv-subject: computers
X-esv-subject: political history
X-esv-subject: social economics
X-esv-importance: very high
X-esv-importance: very low
X-esv-content-type: suitable for children
X-esv-content-type: adult
X-esv-verification: US Postal Service
X-esv-verification: Equifax
X-esv-identity: US passport, <encrypted identity info>
X-esv-header: encrypted, <encrypted header tags>

Many of the current Internet vulnerabilities are due the overburdening of the Domain Name Service (DNS) system. Construed originally as a flexible translation mechanism for network addresses to and from human readable form, the DNS system has become burdened with business branding, trademarks, marketing memes, etc. This overuse has made the DNS system a vulnerable weak spot in the Internet.

Fields in an ESV header, such as in the esv-sysid tag, can be extended to provide a scheme for unburdening the DNS system. The field <Zone id>.<Sys id> can provide a way to intermediate to the DNS system. By removing the direct addressing link between the IP address of the ESV server 26 and the DNS system, the DNS system is not directly burdened by the needs of the ESV system 10. Any system or user that needs to find the IP address of an ESV server 26 can instead go through an ESV address resolver, at least once. Some main benefits of this approach are that the identity of ESV servers 26 are not made directly available, and the ESV sysid can be resolved to different IP addresses—making it harder to initiate IP based attacks.

The sub-field <Zone id> provides a method for aggregating related systems. For example, verification servers in a country, in a state, or that provide a type of verification service (e.g., third-party verification), etc. Both the <Zone id> and <Sys id> sub-fields can be numeric or alphanumeric.

The benefits of using the <Zone id> sub-field can also be extended to automated web cataloging. Currently there are many web directories but classification processes are primarily manual, since there is inadequate capability for automated cataloging of the web. Extending the use of <Zone id> to categories and attributes can therefore provide a means for automating web cataloging. This automated cataloging, particularly if supplemented by human-assisted verification, can greatly enhance the ability to locate information on the web, better than non-differentiated search systems currently in deployment. This can provide an automated way to organize the web, similar to the classification in Yellow Page directories or library cataloging. Using the ESV system 10, it is possible to establish third-party services which can provide human-assisted classification services, which are encoded in the web-pages. Information service providers will then be able to use the classification encoded in the web-pages to build automated directories after validating through the third-party classification providers, and offer as value added information services. For example, libraries can offer ESV classification services for web-pages, since they already have the expertise in organizing knowledge and information.

To accomplish this, ESV header fields, as described herein, can be embedded as part of HTML web pages. TABLE 6 outlines an example of an ESV header embedded in an HTML page.

TABLE 6

```
<html>
<head>
    <title>Sample ESV cataloging page</title>
        <meta name="ESV header"
        Content= "(include email and ESV header information)"
        >
</head>
<body>
    <! --- web page content --- >
</body>
</html>
```

And TABLE 7 outlines an example of an HTML page with an ESV classification.

TABLE 7

```
<html>
<head>
    <title>Cars Are Us</title>
        <meta name="ESV header"
        Content =   "From: info@FlowerCenter.com
            X-esv-sysid: Florists.San Francisco.Powell.21
```

TABLE 7-continued

```
            X-esv-classification: AY2001, SB449, Library of
            Congress
            X-esv-category: Florists
            X-esv-id: a4kadrupqmw4w56
            X-esv-type: private key"
            X-esv-verification: SBC
      >
   </head>
   <body>
         <!--- web page content --- >
   </body>
</html>
```

FIG. 15a (prior art) depicts the current DNS and domain based Internet, without any automated classification support and FIG. 15b depicts how an ESV name space 180 allows automated classification of Internet addresses, hosts, domains, and websites based on verifiable categories and attributes. The ESV name space 180 offers an automated way of organizing websites, domains and hosts to fit a particular or set of categories and/or attributes defined through the ESV header fields embedded in web pages. This will enable much more efficient and focused Internet browsing and searching. For example, voluntary, verified, and approved classification of the categories and attributes can be implemented with the help of the X-esv-id tag contained in the ESV header and the associated email address contained in the standard "From" field because the email address can be reliably traced to a responsible person with the ESV system 10.

FIG. 16 shows a system architecture for the ESV name space 180. The approach here is similar to the DNS system for the Internet, with one exception. An optional private network 182 (e.g., private network 32) and ESV name space server 184 provide connectivity for updating and keeping the ESV servers 26 current in the ESV name space 180. The private network 182 may be run with protocols that are optimized for short control and management message transfer, or it may use Internet protocols. The private network 182 overcomes deficiencies of the current Internet DNS system, which use the Internet for propagating and obtaining DNS information. If the private network 182 is not available, then the ESV servers 26 can simply revert to obtaining information about the ESV name space 180 using connections via the Internet 22.

An ESV header block can also be used to provide a simplified means for "Interlinking" (i.e., an ESV interlink) different systems that do not have direct interfacing. The current trend is to use Web Services protocols such as Simple Object Access Protocol (SOAP), Universal Description, Discovery and Integration (UDDI), etc. The drawback of such an approach is the need to re-engineer existing implementations using the new protocols to enable Internet/Web based integration. Using the ESV header, however, this interfacing problem can be simplified by a 2-stage process. First, the ESV header can provide Interlink information. The ESV header block (using well established RFC 822 email syntax) can be used for transferring Interlink information, which can include description and identification of non-Internet (legacy) interfacing. Second, The use of a deployed (more efficient) interface permits follow-on information exchanges. By using the interface identified in the ESV header, systems can switch from Internet based to non-Internet based means for completing the rest of information exchange and transactions.

ESV interlinking provides a simplified way for integrating useful non-Internet systems into the Internet infrastructure, without major re-engineering, allowing continued use of non-Internet systems that may have unique advantages, such as performance efficiency, lower overhead, etc. In addition, by removing the need to have permanent connectivity to the Internet, ESV interlinking can enhance the security of the interlinked systems, while limiting the vulnerability of the Internet if such systems were otherwise directly connected to it using Web Services.

TABLE 8

Sample Interlink message

From: admin@netservices.net
To: admin@newbank.com
Date: Mon, 15 Dec 2003 14:23:32 -0800
X-esv-sysid: Interlink.networks.sprint
X-esv-id: qesitoswqda39ae6dkivft
X-esv-type: private key
X-esv-interlink: ISDN, Sprint, B channel, Frame Relay, 1-555-123-1111
X-esv-interlink-method: pre configured
Subject: Interlink request
Hello,
Here is the information for Interlinking to our transaction network.
This email includes ESV Interlink information to a Sprint ISDN, B channel Frame Relay connection.
In case of problems, please call (555) 222-3333.
Thanks,
Joe The ESV interlink header can be published on the web and achieve the same results. Using the ESV interlink approach, disconnected systems can be automatically connected, based on an email. Depending on the nature of the interlinking desired, however, additional service configurations, setups, and human interactions may be required before automated Interlinking is possible.

Another use of ESV interlinking is to access information between different systems. For example, information in online communities (also called "social networks"). Even though different online communities serve the same purpose, generally, they typically require their members to separately join each group. Providing a simplified publishing and sharing of member information between online groups is therefore very beneficial to extend community reach and member convenience. This information sharing can be achieved through ESV interlinking.

TABLE 9

ESV interlink for data sharing

From: john@socialnet1.com
To: susan@socialnet2.com
Date: Mon, 15 Nov 2003 14:23:32 -0800
X-esv-sysid: social.networks.100
X-esv-id: qesitoasda39aeljivft
X-esv-type: private key
X-esv-interlink: data interchange
X-esv-interlink-method: direct access
X-esv-interlink-data: html
X-esv-interlink-data: SQL, firstname, lastname, email, phone, url
Subject: Interlink request
Hello,
Please join our new forum of people who are interested in discussing economic and political topics.
Since you are already a member of Socialnet2, you can join the group by clicking this link <ESV Interlink url>. In case of problems, please call (555) 222-3333.
Thanks,
John The ESV Interlinking takes advantage of the pervasive nature of the Internet email to share details of interface and information sharing, in a two-stage process. The information exchange could be on an ad hoc basis, or permanent, after the initial Interlinking is established. Of course, an ESV Interlink can also be published on the web as well.

Another common application for ESV interlinking is to distribute contact information. Currently there is no uniform way to access contact details, such as name, phone number, fax number, email address, mailing address etc. Storing this information during an ESV profile setup in association with an email address can make such information available to other applications using ESV interlinking. The owner of such information only has to update their contact details once, and all ESV capable applications and users who need it can then access it without the need for manual synchronization—as is currently the case.

FIG. 17 shows how the ESV system 10 can also support an ESV Secure Data Store. Since email address registration provides an anchor point for aggregating user information, it is important to plan against data loss or theft of sensitive information such as bank account numbers, passwords, credit card numbers, etc. The usual way of storing such information is today by encrypting it.

Instead, the risk of data loss, compromise, etc. can be mitigated by dividing up the data into separate parts and storing them in separate ESV data servers 186. For instance, conceptually, if a credit card number is being stored, a unique hash key generated from the data can be stored with the first six digits in a first ESV data server 186, with the next six digits in a second ESV data server 186, and with the next six digits in a third ESV data server 186. The hash key can then be stored in the primary ESV database 28, without any of the sensitive data. The sensitive data thus is not stored in its entirety in any one ESV data server 186. Of course, this concept can be extended. For example, the data in each of the ESV data servers 186 can be encrypted for another layer of protection and still higher degrees of security, reliability, and usability can be had by including biometric identification data (such as a fingerprint, iris scan, etc.). By de-aggregating data in this manner, the ESV system 10 can be used as a convenient means for users to manage the ever increasing number of passwords, identification numbers, account numbers, etc. TABLE 10 shows an example of how such an embodiment can be accessed using Interlinking by any system, without requiring centralized processing on the ESV server 26 that becomes a bottleneck.

TABLE 10

ESV Secure data store access with interlinking

From: mary@isp1.net
X-esv-sysid: accounts.sys1, accounts.sys6, accounts.sys14
X-esv-id: qesitoasda39aeljivft
X-esv-type: private key
X-esv-interlink: secure data store
X-esv-interlink-method: direct access
X-esv-interlink-data: SQL, key, CR_part1, CR_part2, CR_part3

An additional level of sender (user) privacy can be achieved by using sender's public key, alone or in combination with an ESV server key, to encrypt sender identity information for storage. Systems can be built that request the key from a sender controlled system each time the sensitive information is accessed. Sender authorizations may be streamlined, for example, through mobile devices, such as notebooks, cell phones, or personal digital assistants (PDA), so the individuals can have control over how their privacy is managed.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A method for email sender verification, the method comprising:
    (a) including a tag in an email, wherein said tag contains an identity datum for a sender of the email and said identity datum is stored in association with an email address of said sender at a server that is physically remote from both said sender and said recipient;
    (b) sending said email via a network, wherein a sender address becomes associated with said email;
    (c) providing at least said identity datum, taken from said tag, to said server to retrieve said email address of said sender;
    (d) comparing said email address with said sender address, thereby verifying that said email came from said sender when said email address and said sender address match; and
    (e) forwarding said email to one or more of a plurality of shadow email folders based on pre-set criteria for at least one of said email address and said sender address, wherein said shadow email folders have private email addresses that are not otherwise used.

2. The method of claim 1, further comprising:
    prior to a first said (a), requesting said tag from said server.

3. The method of claim 1, further comprising:
    prior to each instance of said (a), requesting said tag from said server, thereby dynamically obtaining said tag for each instance of a said email.

4. The method of claim 3, further comprising:
    selectively issuing or not issuing said tag based on criteria provided as part of said requesting and a usage policy pre-set by said sender.

5. The method of claim 1, further comprising:
    prior to said (a), encrypting said identity datum; and wherein,
    said (c) includes decrypting said identity datum taken from said tag.

6. The method of claim 5, wherein:
    said encrypting is based on a private key and said decrypting is based on a public key.

7. The method of claim 5, wherein:
    said private key and said public key belong to said sender.

8. The method of claim 1, further comprising:
    prior to said (a), said sender sending said email to an email server; and
    said (a) occurring and said (b) initiating at said email server.

9. The method of claim 1, wherein:
    said (b) includes said recipient receiving said email at an email server;
    said email server performs said (c) and said (d); and the method further comprising,
    providing a result for said (d) to said recipient.

10. The method of claim 1, wherein:
    said identity datum is information about said sender that is one of: confirmable against a public record, confirmable against a private record not generated by said server, or confirmable against a private record unique to said server.

11. The method of claim 1, wherein:
said identity datum includes at least one of a telephone number, a driver license number, government insurance account number, commercial insurance account number, bank account number, customer account number, user identifier, student number, national identity number, passport number, biometric data, and digital certificate associated with said sender.

12. The method of claim 1, wherein:
said tag is in request for comment (RFC) 822 extension encoding.

13. A system for email sender verification, the system comprising:
a sender email application to send an email for a sender;
a recipient email application to receive said email for a recipient;
a network connecting said sender email application to said recipient email application, wherein a sender address becomes associated with said email;
a sender verification server to access a database storing an identity datum for said sender in association with an email address of said sender;
said sender email application further to include a tag in said email containing said identity datum;
said recipient email application further to provide at least said identity datum, taken from said tag, to said sender verification server;
said sender verification server further to retrieve said email-address, thereby permitting comparison of said email address with said sender address to verify whether said email came from said sender; and
said sender verification server further to forward said email to one or more of a plurality of shadow email folders based on pre-set criteria for at least one of said email address and said sender address, wherein said shadow email folders have private email addresses that are not otherwise used.

14. The system of claim 13, wherein:
at least one of said sender email application and said recipient email application is an email agent that runs on a respective computerized device of said sender or said recipient.

15. The system of claim 13, wherein:
at least one of said sender email application and said recipient email application is an email server that is a gateway to a respective computerized device of said sender or said recipient that runs an email agent.

16. The system of claim 13, further comprising:
a recipient verification server to intermediate between said recipient email application and said sender verification server.

17. The system of claim 16, wherein:
said network is the internet and said recipient verification server communicates with said sender verification server via said network.

18. The system of claim 16, wherein:
said network is a first network which is the internet; and further comprising,
a second network which is private; and
said recipient verification server communicates with said sender verification server via said second network.

19. The system of claim 18, wherein:
said second network is a signaling system seven (SS7) type network.

20. A system for email sender verification, the system comprising:
sender means for sending an email for a sender;
recipient means for receiving said email for a recipient;
network means for connecting said sender means to said recipient means and associating a sender address with said email;
sender verification means for accessing a database storing an identity datum for said sender in association with an email address of said sender;
said sender means further for including a tag in said email containing said identity datum;
said recipient means further for providing at least said identity datum, taken from said tag, to said sender verification means;
said sender verification means further for retrieving said email-address, thereby permitting comparison of said email address with said sender address to verify whether said email came from said sender; and
said sender verification means further for forward said email to one or more of a plurality of shadow email folders based on pre-set criteria for at least one of said email address and said sender address, wherein said shadow email folders have private email addresses that are not otherwise used.

* * * * *